March 28, 1967  S. BALL  3,311,538
STREPTOMYCES DERIVED ANTIBIOTICS
Filed Feb. 12, 1963  4 Sheets-Sheet 2
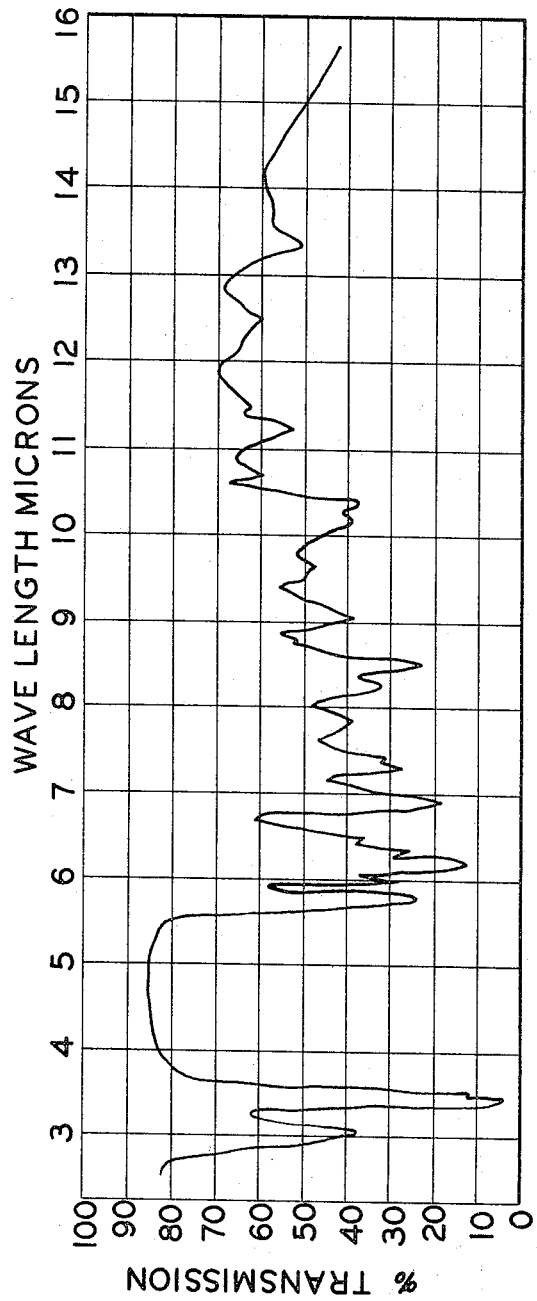

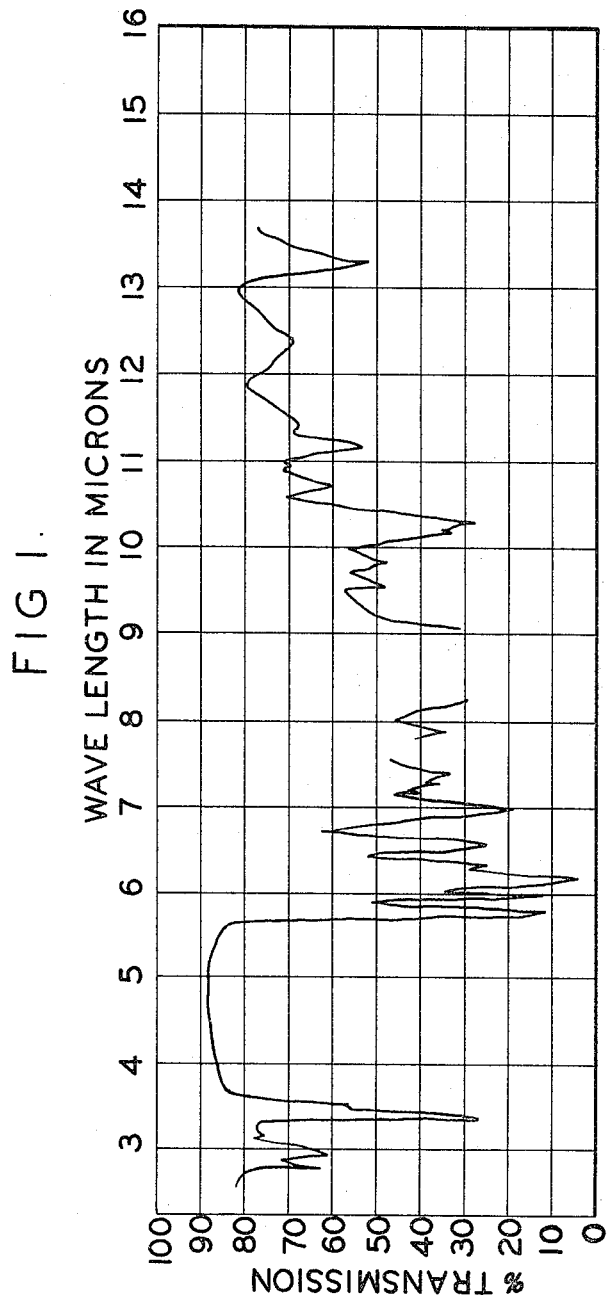

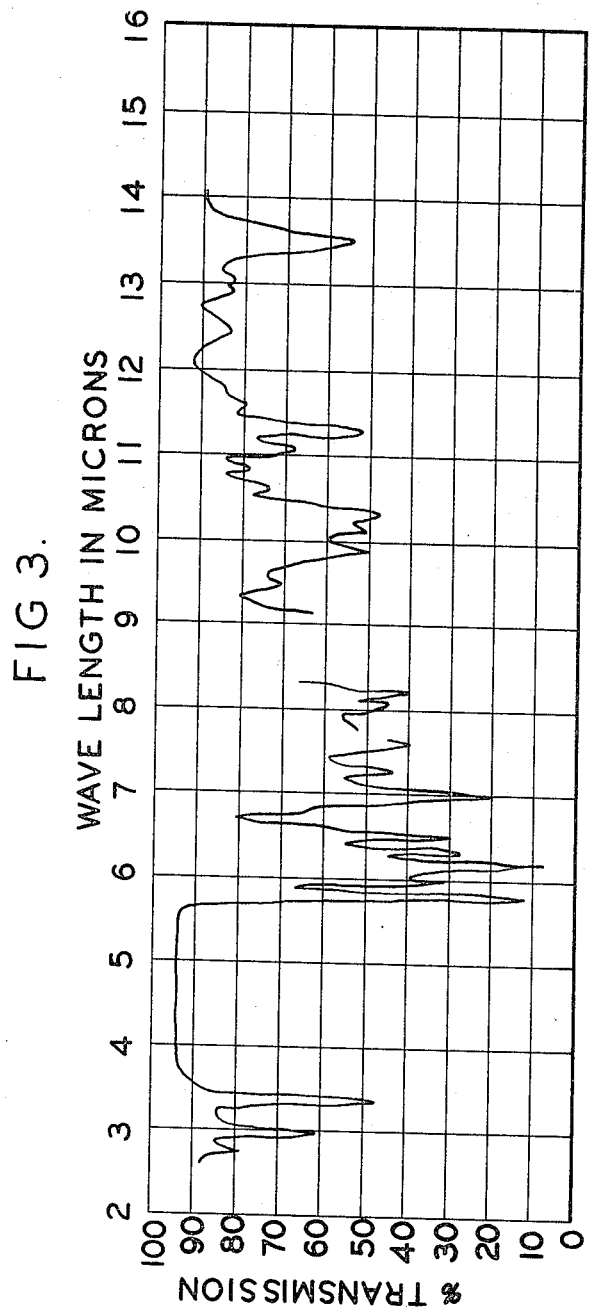

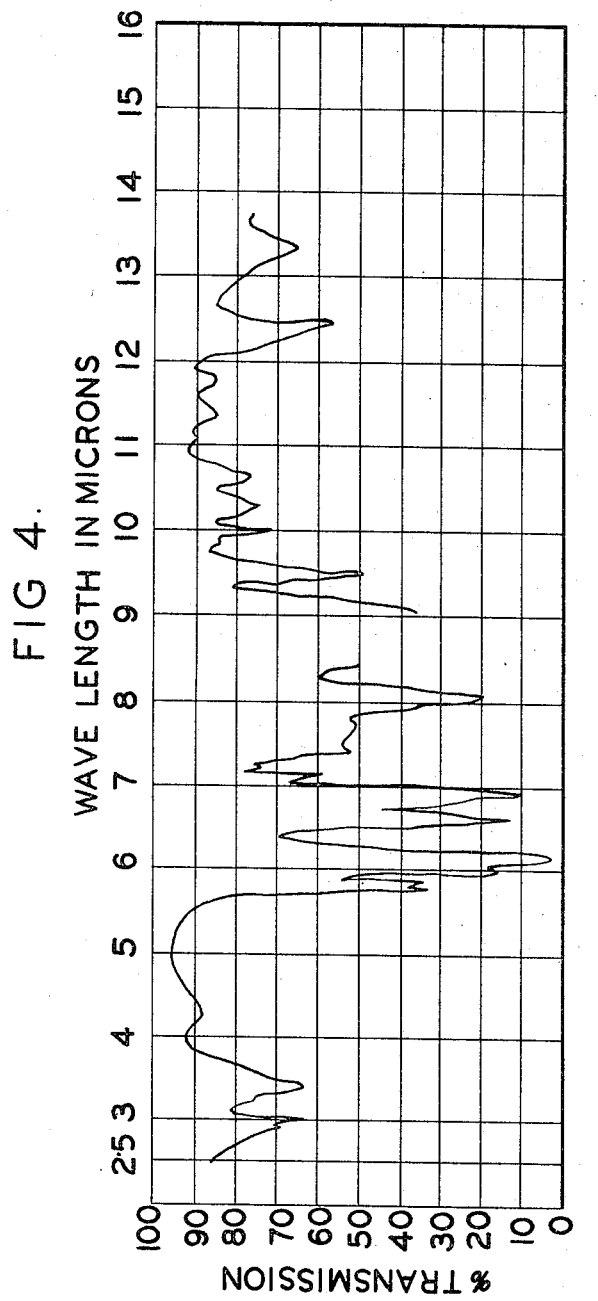

United States Patent Office

3,311,538
Patented Mar. 28, 1967

3,311,538
STREPTOMYCES DERIVED ANTIBIOTICS
Stanley Ball, Gerrards Cross, England, assignor to Glaxo Group Limited, Greenford, England, a British company
Filed Feb. 12, 1963, Ser. No. 258,032
Claims priority, application Great Britain, Feb. 8, 1956, 3,981/56; Feb. 18, 1957, 5,461/57
5 Claims. (Cl. 167—65)

The present application is a continuation-in-part of application Ser. No. 714,171, filed Feb. 10, 1958, now abandoned and Ser. No. 806,295, filed Apr. 14, 1959, now abandoned; and this last-mentioned application is in turn a continuation-in-part of abandoned application Ser. No. 637,667, filed Feb. 1, 1957.

This invention is concerned with improvements in or relating to antibiotics.

In the application of Kenneth A. Lees et al., Ser. No. 602,634, filed Aug. 7, 1956, now abandoned, there is described a crude antibiotic material there designated E.129 and methods for the production thereof, for example by the fermentation of the organism *Streptomyces ostreogriseus* (N.R.R.L. 2258; N.C.I.B. 8792). As stated in the said specification the antibiotic material appeared to comprise a mixture of substances one or more of which exhibited antibiotic activity. The material was also said to bear resemblance to an antibiotic called streptogramin.

I have discovered that a component of E.129, designated Factor B, is a new antibiotic substance. Crude E.129 material contains two other antibiotic factors, designated Factor A and Factor Z, identified as being the same as two antibiotics PA114A and PA114B by Chas. Pfizer & Co. Inc. (W. D. Celmer and B. A. Sobin—Antibiotics Annual, 1955–6, page 437).

The two antibiotics PA114A and PA114B have been described as acting synergistically in that the two compounds in admixture exhibit greater antibiotic activity than can be accounted for by a mere summation of the respective activities of the individual components of the mixture. These findings have been confirmed.

I have made the further discovery that Factor Z of E.129 (i.e. antibiotic PA114B) also exhibits synergism when admixed with Factor B of E.129 which as stated above is a new substance. Moreover mixtures of Factor B and Factor Z have been found to exhibit considerably greater antibiotic activity than comparable mixtures of PA114A and PA114B. For example, in experiments on the protection of animals from infection by *Staphylococcus aureus* there has been obtained an $ED_{50}$ in the mouse for a 1:1 by weight mixture of Factor B and Factor Z of 104, whilst with a 1:1 mixture of PA114A and PA114B the corresponding $ED_{50}$ value is 650. (The $ED_{50}$ value is given as the number of micrograms per mouse administered on three consecutive days required to protect 50% of the animals tested from the experimental infection.)

It is an object of the present invention therefore to provide a new antibiotic factor and a new antibiotic material in which this factor is combined with another antibiotic factor in synergistic relation.

Having regard to the interaction of the two Factors B and Z above referred to, in order to secure useful results improved preparations based upon the present invention must contain these two factors in certain limiting proportions, hereinafter set forth. Furthemore it is necessary that the preparations should be in some measure freed of impurities produced in fermentation whether such impurities have antibiotic activity or not.

Accordingly the invention provides compositions comprising E.129 Factor B and E.129 Factor Z in which the relative proportion by weight of each said factor to the other is within the range of from 1:5 to 5:1 which compositions do not contain more than 70% by weight of contaminating material derived from the fermentation producing said factors.

Whilst as stated the compositions should not contain more than 70% of contaminating material derived from the fermentation producing said factors it will be understood that the compositions may include other substances, for example pharmaceutical adjuvants, which may exceed 70% of the composition. The composition may for example, take the form of tablets containing the said factors blended with suitable tableting adjuvants.

It is to be noted that Factor B is apparently preferentially synergized by Factor Z (PA114B) and that addition of PA114A (which is E.129 Factor A) to mixtures of Factor B and Z gives in general no evidence of substantial added synergism. However if there is marked excess of Factor Z addition of PA114A may give rise to some increase in total activity.

It is preferred that the relative proportion of Factors B and Z in the composition according to the invention, should be within the range of from 1:3 to 3:1. Best results appear to be obtained with mixtures in which the ratio of Factor B to Factor Z is approximately 1:1 by weight.

The respective factors B and Z are difficult to prepare in pure form from crude E.129 produced by fermentation and in fact it is not necessary for the factors to be completely freed from other material produced by the fermentation since the contaminating material including the other antibiotic-active factors present are not apparently deleterious, for example when given by mouth. As stated above however, the contaminating material must not represent more than 70% of the whole antibiotic mixture and preferably should not be more than 50%. Desirably the proportion of Factor B present should be at least 15% and advantageously more than 25% by weight.

Usually as obtained from crude E.129 the proportion of Factor B present will exceed the proportion of Factor Z although mixtures containing approximately equal proportions by weight exhibit the greatest synergism.

The new antibiotic compositions according to the invention can be adminstered in any desired manner. Thus, they may, for example, be adapted for oral administration or parenteral administration. In the case of oral compositions these may for example, conveniently take the form of tablets, capsules, suspensions, syrups and elixirs.

While, as stated, it is not necessary to isolate Factor B from crude E. 129 in order to prepare compositions containing it in synergistic combination with Factor Z, it has been isolated in pure crystalline form to provide a product which can be mixed with Factor Z in any desired proportion. The characteristics of new antibiotic Factor B will now be described in order to distinguish it from the other factors obtainable from crude E. 129 and, therefore, from PA114A and PA114B (Factors A and Z respectively). In the first place, Factor B is, as will be seen later, clearly distinguished from the other E. 129 factors by its $R_f$ value of 0.45 obtained using a descending chromatographic system with Whatman No. 2 paper and as developing solvent the upper phase obtained after equilibrating a mixture of benzene, methanol and water (100:45:55 v./v.). In addition, Factor B has a characteristic infra-red spectrum, which is shown in FIGURES 1 and 2 of the accompanying drawings. These are respectively the infra-red spectrum of a 1% solution in bromoform and of a Nujol mull. FIGURE 3 shows for comparison with FIGURE 1 the infra-red spectrum of a 1% solution of Factor A (PA114A) in bromoform. A cell of 0.8 mm. thickness was used for the bromoform spectra, the apparatus being a Perkin-Elmer model 21 infra-red spectrophotometer. In each figure the horizontal and vertical co-ordinates represent wave-length in microns and percentage transmission respectively. As will be seen from these spectra Factor A An antibiotic substance which has certain superficial resemblances to Factor B is anisomycin which is described by Tanner et al. in U.S. Patent No. 2,691,618. This antibiotic is, however, clearly distinguished from Factor B as will be apparent from a comparison of the properties of these two compounds which is set out in tabular form below.

| Property | Anisomycin | E. 129, Factor B |
|---|---|---|
| Analysis | C, 63.55; H, 7.27 N, 5.20; O, 23.98 | C, 63.25; H, 7.10. N, 8.05; O, 21.6. |
| Optical rotation | −45°±3 (c., 1% in chloroform) | −17.4° (c., 0.4% in methanol). |
| Ultra-violet absorption maxima | 224, 277 and 283 m$\mu$ | 215 m$\mu$. |
| General Properties | Basic | Neutral. |
| Infra-red spectrum | Quite distinct from each other, e.g. in the region 2.6–3.0 m$\mu$. | |
| Microbiological activity | Active against fungi and protozoa. Little activity on bacteria. | Active against gram positive bacteria. No appreciable activity against fungi or protozoa. | in bromoform solution has an intense absorption band at about 3.33$\mu$ and a less intense absorption band at 5.99$\mu$, whereas Factor B in the same solvent has an intense absorption band at 5.99$\mu$ and a less intense band at 6.33$\mu$. Again, Factor A has a strong absorption band at about 10.33$\mu$ and a slightly weaker band at 11.29$\mu$; Factor B on the other hand, has a strong absorption band at about 10.36$\mu$ and a considerably less intense band at 11.24$\mu$. The infra-red spectrum of Factor B in bromoform solution shows absorption maxima at the following wave-lengths: 2.75, 2.83, 2.97, 3.37, 3.48, 5.79, 5.99, 6.17, 6.33, 6.60, 6.99, 7.20, 7.42, 7.90, 8.28, 9.63, 9.93, 10.25, 10.36, 10.76, 11.24, 11.51, 12.45, and 13.33$\mu$. The figures stated are accurate to within ±0.01$\mu$ at the lower end of the scale and ±0.05$\mu$ at the upper end.

The ultra-violet absorption spectrum of Factor B in ethanol shows a weak maximum at $$215 \, m\mu \, (E_{1\,cm}^{1\%} = 650)$$

Factor B is readily soluble in lower alcohols, ketones, esters, methylene dichloride, acetic acid, dioxane and dimethylformamide. It is moderately soluble in benzene and slightly soluble in water and the lower ethers. It is almost insoluble in light petroleum and carbon tetrachloride. Factor B has an optical rotation $\alpha_D^{20}$ of −17.4° (c. 0.4 in methanol); chemical analysis of Factor B gives carbon 63.25%, hydrogen 7.10%, nitrogen 8.05% and oxygen 21.60%. The molecular weight of Factor B as determined by the Rast camphor method is 650.

Apart from the characteristics described above, Factor B has a characteristic anti-bacterial spectrum as follows:

| Organism | Minimum inhibitory concentration, $\gamma$/ml. |
|---|---|
| Serial twofold dilutions in nutrient broth. Incubated 37° C., 48 hrs.: | |
| Sarcina lutea, NCTC 611 | 0.32 |
| Sarcina lutea | 0.625 |
| Micrococcus flavus, NCIB 8166 | 0.32 |
| Staphylococcus aureus clinical isolate | 20.0 |
| Staphylococcus aureus streptomycin laboratory resistant strain | 10.0 |
| Staphylococcus aureus, NCTC 7447 | 5.0 |
| Staphylococcus saprophyticus, NCTC 7292 | 10.0 |
| Staphylococcus lactis, NCTC 7564 | 0.62 |
| Staphylococcus afermantans, NCTC 7749 | 1.25 |
| Staphylococcus aureus | 10.0 |
| Bacillus cereus, NCTC 6349 | 20.0 |
| Bacillus mycoides, NCTC 6093 | 20.0 |
| Bacillus megatherium, NCIB 8508 | 20.0 |
| Staphylococcus albus, NCTC 7292 | 10.0 |
| Serial twofold dilutions papain digest broth +5% horse serum: | |
| Streptococcus faecalis, Strain 1 | 2.5 |
| Streptococcus faecalis, Strain 2 | 5.0 |
| Staphylococcus aureus, Strain 1 | 5.0 |
| Staphylococcus aureus, Strain 2 | 10.0 |

A further antibiotic substance from which Factor B can with advantage be distinguished is that described by De Somer et al. in Antibiotics and Chemotherapy, November 1955, pp. 632–639, and identified as "No. 899." It is clear from a comparison of the infra-red spectra of Factor B and "No. 899" that the two substances are distinct as, apart from a general difference in the infra-red curves, there is a marked difference in the relative intensities of the infra-red maxima.

Other antibiotics with which Factor B might be compared include streptrogramin, which is described by J. Charney et al. in Antibiotics Annual, 1953/54, pp. 171–173, and albomycetin, argomycin and amaromycin, which are described in Journal of Antibiotics, January 1955, pp. 9–13 and August 1955, pp. 126–131. These antibiotics are clearly distinguished from Factor B as a comparison of their chemical, physico-chemical and microbiological properties reveals. As far as I am aware, there is no evidence either that any of the above antibiotics contain Factor B as an ingredient thereof.

Factor B may be prepared from crude E. 129 by a number of methods, including chromatography and counter-current extraction. Thus, one such method involves chromatographic absorption of crude E. 129 on a suitable absorbent, preferably acidic alumina. On elution, an eluate rich in Factor B can be obtained from which Factor B can be obtained by evaporation in vacuo. Alternatively, the eluate rich in Factor B can be treated by a counter-current distribution process to obtain substantially pure Factor B. One suitable chromatographic procedure, which has been found convenient for effecting separation of Factor B on a laboratory scale, involves the use of acidic alumina at pH 4, slurried with ethylene dichloride and packed under pressure in a glass tube to yield a good chromatographic column, through which is then passed a solution in ethylene dichloride of crude E. 129. The chromatogram thus obtained can then be developed first with ethylene dichloride and then with chloroform as eluants, a yellow colored eluate being obtained, and the main cut and tailings being separately collected in each case. Final development in the same manner can be carried out using a mixture of methanol, ethyl acetate and water as eluant. All the fractions thus eluted are then taken to dryness in vacuo, redissolved in a small quantity of a suitable organic solvent, e.g. chloroform, and precipitated with an excess volume of a hydrocarbon solvent, such as petroleum ether. The solids thus obtained should be dried, preferably in a vacuum desiccator, and are then ready for further testing.

On testing the solids obtained, it is found that the chloroform eluate, both main cut and tailings, contains the major proportion of Factor B and a small proportion of Factor A, whilst the ethylene dichloride eluate, both main cut and tailings, contains the major proportion of Factor A, and only a small proportion of Factor B. The methanol/ethyl acetate/water eluate contains some of all the input factors.

In order to obtain Factor B from the chloroform eluate, the eluate can, as stated above, be evaporated to dryness in vacuo. Alternatively, the chloroform eluate may be taken and subjected to further treatment to obtain pure Factor B therefrom; such treatment preferably takes the form of a counter-current distribution process.

In such a counter-current process, use is made of the different partition coefficients of the various E. 129 factors present in a particular two-phase solvent system. Although the differences in the partition coefficients of the different factors may be small, it is found that by carrying out a sufficient number of transfers in a counter-current system, it is possible to obtain the factors in substantially pure form. Thus, by this method, substantially pure Factor B can be obtained from an eluate rich in Factor B, for example the chloroform eluate obtained from the chromatographic separation described above, by carrying out at least 20, preferably at least 25, transfers in a counter-current system.

In a second method of preparing Factor B from crude E. 129, one may subject crude E. 129 directly to counter-current extraction, without previous chromatographic treatment, and, indeed, this is often to be preferred. This procedure applied to crude E. 129 yields substantially pure Factor B, provided a sufficient number of transfers is used is in the counter-current extraction, that is at least 20 and preferably at least 25 transfers.

It should be noted that, as the difference in partition coefficients between the factors determines the number of transfers necessary to effect substantially complete separation thereof by counter-current extraction, the same number of transfers will, in general, be required to isolate Factor B directly from crude E. 129 as from the chloroform eluate resulting from elution of a chromatographic column having crude E. 129 adsorbed thereon.

Suitable solvent systems which may be utilized in the counter-current process include, for example, ethyl acetate, water and methanol or benzene, methanol, water, the proportions of the various solvents used being such that on equilibrium equal amounts of both top and bottom phases are obtained. Thus, for the ethyl acetate/water/methanol system, the proportions by volume of the components are preferably 4:2.5:1.5 respectively. In the case of the benzene/methanol/water system, the proportions can be, for example, 2:1:1, 4:1:3 or 3:1:2, respectively.

After counter-current distribution, the factors isolated may be recovered from the solvents in which they are present in any suitable manner. For example, the solvents may be distilled off from the mixed phases in vacuo to yield the solid factor. Alternatively, the separated aqueous phase may be extracted with chloroform or methylene dichloride and the extract added to the separated organic phase, the organic solvents then being distilled off in vacuo as before. By following this latter method, distillation in the presence of an appreciable volume of water is avoided and the danger of inactivation of the factor being isolated is reduced.

In order that the invention may be more fully understood, the following examples are given by way of illustration only.

(A) CHROMATOGRAPHIC SEPARATION AND IDENTIFICATION OF FACTORS

Example 1

5 grams of acidic alumina (pH 4) was slurried in ethylene dichloride and packed under pressure into a glass tube (1 cm. diameter) to form a good chromatographic column. The alumina used was supplied by M. Woelm, Eschwege, Germany, under the label Aluminiumoxyd Woelm acid activity grade 1 for chromatographic analysis. 0.5 gram of a crude E. 129 solid dissolved in approximately 6 ml. of ethylene dichloride, was passed through the chromatographic column.

The chromatogram was developed with ethylene dichloride which gave a yellow colored eluate. This was continued until no more color was eluted, the main cut and tailings being collected separately. Development was continued with chloroform which again produced a yellow colored eluate. Chloroform was passed through until no further color was removed, the main cut and tailings again being collected separately. Finally, a mixture of methanol, ethyl acetate and water 4:5:1 v./v., was used as developing solvent giving once more a yellow colored eluate. All the fractions obtained in this manner were taken to dryness in vacuo, the solids dissolved in a minimum of chloroform, and precipitated with 6 volumes of petroleum ether (60°–80°). The mother liquors from the precipitations showed no microbiological activity and were rejected. The solids were then dried in a vacuum desiccator for 1 hour.

Example 2

A chromatographic column of 20 grams of acid alumina was prepared as in Example 1. To this column was applied 2 grams of crude E. 129 dissolved in 20 ml. of ethylene dichloride. Some of the crude solid remained undissolved and was separated by centrifugation before the solution was passed through the column. The E. 129 solution was followed immediately by a mixture of ethylene dichloride and petroleum ether (60°–80°) 1:1 v./v. as developing solvent. Fractions of approximately 3 ml. volume were collected and development was continued until the solution passing from the column was colorless. The developing solvent was then changed to ethylene dichloride-petroleum ether (60°–80°) 3:1 v./v. and the process repeated. This solvent was then followed by ethylene dichloride, chloroform and the methanol, ethyl acetate, water 4:5:1 v./v. mixture. The fractions obtained were processed to solids in the same manner as in Example 1.

(B) FURTHER TREATMENT OF CHROMATOGRAPHIC ELUTES TO OBTAIN PURE FACTORS

Example 3

5 grams of a fraction rich in Factor B was isolated from the chloroform eluate obtained according to Example 1. This was shaken vigorously with 200 ml. of the top phase obtained after equilibrating benzene, methanol, water (2:1:1 v./v.) and the insoluble residue of 0.152 gram was filtered off. The soluble material was passed through a seven stage counter-current distribution in separating funnels using 200 ml. volumes of top and bottom phases the bottom phase being passed along. The aqueous phases were each extracted twice with 100 ml. volumes of chloroform and the chloroformic extracts were added to the corresponding upper phases and the solvents were removed by distillation in vacuo. The main bulk of the Factor B was found in the last 3 funnels (i.e. the water-soluble end of the distribution) and these gave a combined weight of 1.515 grams.

0.255 gram of the partially purified Factor B was passed through 25 transfers in an automatic all glass counter-current apparatus using 20 ml. volumes of the phases obtained by equilibrating benzene, methanol, water (4:1:3 v./v.) the top phase being passed along. The fractions were worked up as before and the weight distribution curve showed a very pronounced peak at tube 10 corresponding to the Factor B constituent. The bulked solids from tubes 7–13 weighed 0.104 gram and were shown to be a highly purified Factor B preparation by paper chromatography and infra-red spectroscopy. A further peak in the weight distribution curve at tube 19 was shown to be substantially pure Factor A.

Example 4

Crude E. 129 was treated as follows to remove tarry and other contaminants:

The crude material was dissolved in methylisobutylketone, the solution concentrated to small bulk and filtered. 5 volumes of light petroleum were added to the filtrate, the resulting precipitate filtered off and redissolved in methylene dichloride. To this solution were added 1.5 volumes of carbon tetrachloride and the precipitated tarry matter filtered off. The resulting filtrate was concentrated to small bulk and poured into 5 volumes of light petroleum and the resultant precipitate rich in Factor B was filtered off.

0.460 gram of this precipitate rich in Factor B was passed through a 25 stage counter-current distribution using 20 ml. volumes of the top and bottom phases from an equilibrated mixture of benzene, methanol, water (2:1:1 v./v.). In this case, the upper phase was transferred so that fraction 1 contained the most water-soluble constituents and fraction 26 was the material most soluble in the organic phase. The combined top and bottom phases in each fraction were taken to dryness at the end of the distribution and the solids were weighed and examined by paper chromatography. The weight distribution curve showed 3 prominent peaks; at tube 5 for Factor B, at tube 15 for Factor A and at tube 22 for Factor Z. By bulking the contents of tubes 4, 5 and 6, 0.082 gram of highly purified Factor B was obtained, while 0.048 gram of Factor A was obtained from tubes 13–15 and 0.086 gram of Factor Z from tubes 21–24.

Now considering Factor Z, that which acts synergistically with the new Factor B fully characterized above, it has already been pointed out that this factor is identical with previously published antibiotic PA114B but for the avoidance of doubt there is given the following characteristics which have been found for it:

Optical rotation $[\alpha]_D^{20} = -58.0°$ (c.=0.2% in methanol)

Melting point: 270° C. (decomp.)

Ultra-violet absorption spectrum shows:

$$\lambda_{max.}\ 262\ m\mu,\ E_{1\ cm.}^{1\%}\ 222.5$$

$$\lambda_{max.}\ 306\ m\mu,\ E_{1\ cm.}^{1\%}\ 105$$

Elemental analysis:

| | Percent |
|---|---|
| Carbon | 62.20 |
| Hydrogen | 6.08 |
| Nitrogen | 12.88 |

Factor Z gives a red coloration with ferric chloride solution.

The infra-red absorption spectrum of a 1% solution of Factor Z in bromoform is given in the accompanying drawing, FIG. 4, in which the horizontal and vertical coordinates represent wave lengths in microns and percentage transmission respectively. The principal absorption bands in this spectrum are those at the following approximate wave lengths: 2.940, 3.110, 3.380, 3.48, 5.75, 5.82, 5.98, 6.13, 6.57, 6.90, 7.10, 7.40, 8.02, 9.47, 10.00, 10.31, 10.64, 11.36, 11.74, 12.44, 13.33$\mu$.

Factor Z can be isolated from crude E. 129 by absorption on a suitable adsorbent, for example alumina, followed by repeated counter-current extraction, or by repeated counter-current extraction alone or preceded by solvent extraction. One method of isolation of Factor Z from crude E. 129 is, for example, described in Example 4 above.

The following is an example of a method of isolating Factor Z from crude E. 129 which has been found to be particularly useful:

Example 5

60 grams of crude E. 129 obtained as described in application Ser. No. 602,634 was dissolved in 2½ litres of methyl isobutyl ketone and concentrated in vacuo on a steam bath to a volume of 400 ml. The concentrate was filtered, thus removing 25.5 grams of precipitated Factor A. To the mother liquor was added 1 litre of n-hexane and the precipitated solid was filtered off. This was dissolved in 500 ml. of methylene dichloride and to the clear solution was added 750 ml. of carbon tetrachloride. Tarry material was precipitated and removed by filtration. The clear solution was concentrated in a stream bath in vacuo to a volume of 750 ml. and the concentrate was clarified by passing through glasswool. Three litres of n-hexane was added to this solution and the precipitate of partially purified Factor Z (with Factor B) was removed by filtration. The solid was a pale brown color and weighed 16.5 grams.

5 grams of the partially purified Factor Z obtained was put through a 7-stage counter-current distribution in separating funnels, the aqueous phase being moved along the system. 200 ml. volumes of each of the phases obtained by equilibrating toluene, methanol, water (4:3:1 v./v.) were used and after the 7-stage separation the contents of the third, fourth and fifth funnels were separately taken to dryness in vacuo on a steam bath. The individual weights of solids isolated from the three funnels were 0.279, 0.328 and 0.376 gram respectively. Attempts to crystallize these samples failed, so they were bulked together and redistributed through a further 7-stage counter-current distribution. The same solvent system was used and the volume of each phase was 35 ml. per separating funnel. The contents of the third, fourth and fifth separating funnels were taken down separately to dryness in vacuo on a steam bath and yielded 0.241, 0.175 and 0.130 gram of solid respectively. The combined solids were dissolved in cold toluene and vigorously shaken with an equal weight of SX20 Norit charcoal to remove colored impurities. The charcoal was removed by filtration and the clear toluene solution was concentrated to small volume on a steam bath. On cooling colorless needles of Factor Z appeared, the total yield being 177.1 mg.

As will be appreciated paper chromatography is perhaps the simplest method of recognizing the various E. 129 factors in mixtures containing them. Using a descending chromatographic system with Whatman No. 2 paper and, as developing solvent, the upper phase obtain after equilibrating a mixture of benzene, methanol and water (100:45:55 v./v.) the $R_f$ values of the various factors are as follows:

Factor:

| | |
|---|---|
| Z (PA114B) | 0.7–0.8 |
| A (PA114A) | 0.65 |
| B | 0.45 |
| C | 0.17 |
| D | 0.055 |
| E | 0 |

Factor Z is thus a relatively fast moving factor whilst Factor B is slower than both Factors A and Z.

There have been developed methods of assay designed to estimate the proportions of Factors A, B and Z in E. 129 material which methods are important in a consideration of whether a given crude material contains Factors B and Z in desired proportions for the purpose of this invention. These assays are microbiological and therefore are subject to the limitations of such methods in so far as accuracy is concerned. Two methods (I) and (II) have been developed as follows:

Method I consists of first separating the three factors (A, B, Z) by chromatography on filter paper sheets. These are then applied to agar plates seeded with suitable microorganisms and the sizes of inhibition zones obtained on incubation are compared with inhibition zones caused by known amounts of the three factors. Method II can only be used for the estimation of Factor Z. It is essentially an extension of the ordinary cup plate assay technique. The organism used is one which is much more sensitive to Z than to A or B; any interference by these two factors is further minimized by incorporating a sub-inhibitory level of Factor A in the agar medium.

*Method I.*—The developing solvent for the chromatographic separation of the three factors is the top phase of a mixture of benzene:cyclohexane:methanol:water (5:5:6:4) to which ½% glacial acetic acid is added. Appropriate dilutions of standard amounts of the factors are run alongside the unknown mixtures. From the zones of out for about 7 hours and the agar plates for bioauto- obtained from which the amount of material contained in the test sample can be calculated in the usual way. For the estimation of Factor Z development is carried out for about 7 hours and the agar plates for bioautographs contain 0.05 µg. of Factor A per ml., the test organism being *Staphylococcus aureus* N.C.T.C. 7447 or *B. subtilis* A.T.C.C. 6633. For the estimation of Factor A and Factor B, the development time is 16–24 hours, the agar plates contain 0.1 µg./ml., of Factor Z and the test organism is *Sarcina lutea* N.C.T.C. 611.

*Method II.*—The test organism used in this method is *B. subtilis* A.T.C.C. 6633 and the solid agar medium contains 4 µg./ml. of Factor A. A standard solution of Factor Z in ethanol is diluted with citrate buffer at pH 6.3 to give concentrations of 4.0, 2.0 and 1.0 µg./ml. These dilutions are applied to the agar plate in the usual way, together with dilutions of the test solutions. The plates are incubated overnight at 37° C. and the zone sizes are measured. The logarithm of the dose plotted against the diameter of the inhibition zones gives a straight line response from which the potency of the test samples may be estimated.

For the further understanding of the invention there are now given by way of example only details of experiments conducted upon the antibiotic activity of Factors B and Z:

EXPERIMENT 1

The in vitro activity of mixtures containing various proportions of Factor B and Factor Z was determined, the results being as follows:

| Organism | Minimum inhibitory concentrations in µg./ml. for — | | | | 100% Factor Z |
|---|---|---|---|---|---|
| | 100% Factor B | 95% Factor B 5% Factor Z | 50% Factor B 50% Factor Z | 5% Factor B 95% Factor Z | |
| *Sarcina lutea* | 0.32 | 0.04 | 0.04 | 0.16 | 5.0 |
| *Staphylococcus aureus* | 5.0 | 0.625 | 0.32 | 1.25 | 10.0 |
| *Bacillus cereus* | 10.0 | 1.25 | 0.32 | 0.62 | 1.25 |

EXPERIMENT 2

The in vivo activity of mixtures containing varying proportions of Factor B and Factor Z was determined by protection tests using experimental infections of *Staphylococcus aureus* in mice, the mixtures being injected subcutaneously. The results of two sets of trials were as follows:

(a)

| Sample | | $ED_{50}$ in µg./mouse | $ED_{50}$ in mg./kilo Body weight |
|---|---|---|---|
| Factor B | Factor Z | | |
| 100% | 0% | >1,000 | >50.0 |
| 75% | 25% | 234 | 11.7 |
| 50% | 50% | 150 | 7.5 |
| 25% | 75% | 248 | 12.4 |
| 0% | 100% | >1,000 | >50.0 |

(b)

| Sample | | $ED_{50}$ in µg./mouse | $ED_{50}$ in mg./kilo Body weight |
|---|---|---|---|
| Factor B | Factor Z | | |
| 100% | 0% | >1,000 | >50.0 |
| 75% | 25% | 220 | 11.0 |
| 50% | 50% | 104 | 5.2 |
| 25% | 75% | 210 | 10.5 |
| 0% | 100% | >1,000 | >50.0 |

EXPERIMENT 3

The efficacy of various mixtures of Factor B and Factor Z when administered orally by comparison to subcutaneous administration was studied with the following results:

| Treatment route | Mixture composition | $ED_{50}$, µg./mouse | $ED_{50}$, mg./kilo |
|---|---|---|---|
| Oral | Factor B 100%, Factor Z 0% | 2,500 | 125 |
| | Factor B 75%, Factor Z 25% | 1,020 | 51 |
| | Factor B 50%, Factor Z 50% | 880 | 44 |
| | Factor B 25%, Factor Z 75% | 1,250 | 62.5 |
| | Factor B 0%, Factor Z 100% | 2,500 | 125 |
| Subcutaneous | Factor B 50%, Factor Z 50% | 105 | 5.5 |

EXPERIMENT 4.—BLOOD LEVEL RESULTS

Three preparations were compared in human volunteers, each preparation being administered orally in 2 g. doses. Blood level was determined by the inhibitory activity against *Streptococcus pyogenes* (employing crude E. 129 referred to in Example 5 as a standard) the results being expressed as the crude E. 129 mcg./ml. equivalent. Preparation I contained 10% Factor Z and 25% Factor B. Preparation II contained 23% Factor Z and 21% Factor B. Preparation III contained 50% Factor Z and 50% Factor B.

The average blood levels found in human volunteers at specified times after administration are recorded below for each preparation:

| Time | Preparation I | Preparation II | Preparation III |
|---|---|---|---|
| ½ hour | <0.3 | <0.2 | 0.2 |
| 1 hour | 0.6 | 0.6 | 1.4 |
| 2 hours | 1.3 | 1.0 | 5.0 |
| 4 hours | 0.6 | 2.3 | 5.0 |
| 6 hours | (¹) | 1.3 | (¹) |

¹ Not done.

It will be noticed that preparation II, despite a slightly lower Factor B content, is superior to preparation I, because the Factor B and Factor Z present are approximately in the optimal 1:1 proportions. It will further be observed that preparation III, where the desired proportions 1:1 are associated with highest Factor B content consistent with these proportions, is superior to both the other preparations.

These findings thus accord with those of the animal protection tests in showing that 1:1 proportions of Factors B and Z are to be preferred.

In addition to the fact that Factor B synergizes Factor Z (PA 114 B) to a greater extent than does Factor A, it is more readily soluble in water than either of these factors. This can be an advantage from the point of view of its administration in an aqueous vehicle, for example for injection where increased water solubility can lead to a reduction in the volume of liquid which has to be injected; it is also an advantage from the point of view of its administration per os as, by reason of its greater water solubility, it can be more readily adsorbed into the system. The actual water solubilities of Factors A, B and Z are as follows:

|  | Mgs./ml. at 20° C. |
|---|---|
| Factor A (PA 114 A) | 0.4 |
| Factor B | 2.7 |
| Factor Z (PA 114 B) | 0.17 |

I claim:
1. An antibiotic composition consisting essentially of a mixture of an antibiotic having the following properties:

$R_f$ value using a descending chromatographic system with Whatman No. 2 paper and the upper phase obtained after equilibration of a mixture of benzene, methanol and water (100:45:55 v./v.) as developing solvent=0.45

Infra-red spectra adsorption maxima in bromoform solution at: 2.75, 2.83, 2.97, 3.37, 3.48, 5.79, 5.99, 6.17, 6.33, 6.60, 6.99, 7.20, 7.30, 7.42, 7.90, 8.28, 9.63, 9.93, 10.25, 10.36, 10.76, 11.24, 11.51, 12.45, and 13.33$\mu$, Ultra-violet spectrum absorption maximum in ethanol solution at $$215\ m\mu\ (E_{1\,cm.}^{1\%}=650)$$

Molecular weight (Rast camphor method)=650

| Elemental analysis: | Percent |
|---|---|
| Carbon | 63.25 |
| Hydrogen | 7.10 |
| Nitrogen | 8.05 |
| Oxygen | 21.60 |

Optical rotation $[\alpha]_D^{20}$: −17.4 (c., 0.4 in methanol) readily soluble in lower alcohols, ketones, esters, methylene dichloride, acetic acid, dioxane and dimethylformamide; moderately soluble in benzene; slightly soluble in water and lower esters; substantially insoluble in light petroleum and carbon tetrachloride, and an antibiotic having the following properties:

Optical rotation $[\alpha]_D^{20}$=−58.0° (0.2% in methanol)

Melting point 270° C. (decomp.)

U.V. absorption spectrum $$\lambda_{max.}\ 262\ m\mu,\ E_{1\,cm.}^{1\%}\ 222.5$$

$$\lambda_{max.}\ 306\ m\mu,\ E_{1\,cm.}^{1\%}\ 105$$

Elemental analysis

|  | Percent |
|---|---|
| Carbon | 62.20 |
| Hydrogen | 6.08 |
| Nitrogen | 12.88 |

Red coloration with ferric chloride solution

Infra-red spectra absorption maxima in bromoform solution at: 2.940, 3.1110, 3.380, 3.48, 5.75, 5.82, 5.98, 6.13, 6.57, 6.90, 7.10, 7.40, 8.02, 9.47, 10.00, 10.31, 10.64, 11.36, 11.74, 12.44, 13.33$\mu$, said mixture containing on a weight basis no more than five times as much of one of said antibiotics as of the other and said composition containing no more than 70% by weight of contaminating material derived from the fermentation producing said antibiotics.

2. The composition of claim 1 in which said composition contains no more than 50% by weight of contaminating material derived from the fermentation producing said antibiotics.

3. The composition of claim 2 in which said mixture contains on a weight basis no more than 3 times as much of one of said antibiotics as of the other.

4. The composition of claim 2 in which said mixture contains substantially equal proportions by weight of said antibiotics.

5. In substantially pure form, a compound having antibiotic properties which has $R_f$ value using a descending chromatographic system with Whatman No. 2 paper and the upper phase obtained after equilibration of a mixture of benzene, methanol and water (100:45:55 v./v.) as developing solvent=0.45

Infra-red spectra absorption maxima in bromoform solution at: 2.75, 2.83, 2.97, 3.37, 3.48, 5.79, 5.99, 6.17, 6.33, 6.60, 6.99, 7.20, 7.30, 7.42, 7.90, 8.28, 9.63, 9.93, 10.25, 10.36, 10.76, 11.24, 11.51, 12.45, and 13.33$\mu$, Ultra-violet spectrum absorption maximum in ethanol solution at $$215\ m\mu\ (E_{1\,cm.}^{1\%}=650)$$

Molecular weight (Rast camphor method)=650

| Elemental analysis: | Percent |
|---|---|
| Carbon | 63.25 |
| Hydrogen | 7.10 |
| Nitrogen | 8.05 |
| Oxygen | 21.60 |

Optical rotation $[\alpha]_D^{20}$: −17.4 (c., 0.4 in methanol) readily soluble in lower alcohols, ketones, esters, methylene dichloride, acetic acid, dioxane and dimethylformamide; moderately soluble in benzene; slightly soluble in water and lower ethers; substantially insoluble in light petroleum and carbon tetrachloride.

References Cited by the Examiner

UNITED STATES PATENTS

| 2,653,899 | 9/1953 | Bunch et al. |
| 2,691,618 | 10/1954 | Tanner et al. |
| 2,990,325 | 6/1961 | Donovich et al. |

OTHER REFERENCES

Antibiotics and Chemotherapy, November 1957, pp. 606–614, 1955, pp. 632–639.

Antibiotics Annual, 1955–1956, pp. 437–441, 1953–1954, pp. 171–176.

Celmer et al.: Antibiotics Annual, 1955–1956, pp. 439–452, Nov. 2, 3 and 4, 1955.

Charney et al.: Antibiotics Annual, 1953–1954, pp. 171–173, pub. 1954.

De Somer et al.: Antibiotics & Chemotherapy, pp. 632–639, November 1955.

Hata et al.: J. of Antibiotics, pp. 9–13, Series A, vol. 8, No. 1, January 1955.

J. of Antibiotics, Series A, vol. 8, No. 4, pp. 126–131, August 1955.

Vanderhaeghe et al.: Antibiotics & Chemotherapy, 1957, pp. 606–614.

Waksman et al.: "The Actinomycetes and Their Antibiotics," pub. 1953, by the Williams & Wilkins Co., Baltimore, Md., page 54.

ALBERT T. MEYERS, *Primary Examiner.*

LEWIS GOTTS, *Examiner.*

SAM ROSEN, J. S. LEVITT, *Assistant Examiners.*